US012809310B2

(12) United States Patent
Choo et al.

(10) Patent No.: US 12,809,310 B2
(45) Date of Patent: Nov. 24, 2026

(54) HOLOGRAPHIC OPTICAL ELEMENT AND METHOD FOR MANUFACTURING SAME

(71) Applicant: LG Chem, Ltd., Seoul (KR)

(72) Inventors: So Young Choo, Daejeon (KR); Dae Han Seo, Daejeon (KR); Chang Yoon Lim, Daejeon (KR); Hyun Joo Son, Daejeon (KR); Jae Young Moon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 490 days.

(21) Appl. No.: 18/023,166

(22) PCT Filed: Sep. 13, 2021

(86) PCT No.: PCT/KR2021/012390

§ 371 (c)(1),
(2) Date: Feb. 24, 2023

(87) PCT Pub. No.: WO2022/055315

PCT Pub. Date: Mar. 17, 2022

(65) Prior Publication Data

US 2023/0315013 A1 Oct. 5, 2023

(30) Foreign Application Priority Data

Sep. 14, 2020 (KR) ........................ 10-2020-0117902

(51) Int. Cl.
*G03H 1/04* (2006.01)
*G02B 5/32* (2006.01)
*G03H 1/02* (2006.01)

(52) U.S. Cl.
CPC ............. *G03H 1/0486* (2013.01); *G02B 5/32* (2013.01); *G03H 1/02* (2013.01); *G03H 1/0465* (2013.01);
(Continued)

(58) Field of Classification Search
CPC ...... G03H 1/0486; G03H 1/02; G03H 1/0465; G03H 2001/0212; G03H 2001/0473;
(Continued)

(56) References Cited

U.S. PATENT DOCUMENTS 4,942,102 A 7/1990 Keys et al.
7,391,703 B2 * 6/2008 Volodin .............. G03H 1/0408 385/38

(Continued)

FOREIGN PATENT DOCUMENTS

CN 1050620 A 4/1991
CN 101339335 A 1/2009

(Continued)

OTHER PUBLICATIONS

International Search Report for Application No. PCT/KR2021/012390 mailed Dec. 29, 2021, 2 pages.

(Continued)

*Primary Examiner* — Collin X Beatty
(74) *Attorney, Agent, or Firm* — Lerner David LLP

(57) ABSTRACT

A holographic optical element and a method for producing the same are disclosed herein. In some embodiments, a method includes illuminating a first surface of a photopolymer resin layer, where the photopolymer resin layer comprises a photopolymer resin, illuminating a second surface of the photopolymer resin layer through a retardation layer disposed in the second surface, wherein the second surface is opposite the first surface, and recording an interference pattern in the photopolymer resin layer, wherein the interference pattern is created by interference between the first parallel laser beam and the second parallel laser beam. The holographic optical element is produced using a retardation
(Continued)

layer to prevent an unwanted interference pattern from being formed in the process of recording an interference pattern in a photopolymer resin layer.

11 Claims, 3 Drawing Sheets

(52) U.S. Cl.
CPC ............... *G03H 2001/0212* (2013.01); *G03H 2001/0473* (2013.01); *G03H 2222/12* (2013.01); *G03H 2223/18* (2013.01); *G03H 2223/20* (2013.01); *G03H 2260/12* (2013.01)

(58) Field of Classification Search
CPC ........... G03H 2222/12; G03H 2223/18; G03H 2223/20; G03H 2260/12; G03H 1/0408; G03H 2001/0216; G02B 5/32
See application file for complete search history.

(56) References Cited

U.S. PATENT DOCUMENTS

| | | | |
|---|---|---|---|
| 2003/0039001 | A1 | 2/2003 | King et al. |
| 2005/0128544 | A1 | 6/2005 | Kim |
| 2009/0009668 | A1 | 1/2009 | Tan et al. |
| 2011/0134497 | A1 | 6/2011 | Horimai |
| 2012/0092735 | A1 | 4/2012 | Futterer et al. |
| 2013/0182302 | A1 | 7/2013 | Shikii et al. |
| 2016/0011353 | A1 | 1/2016 | Escuti et al. |
| 2016/0032063 | A1 | 2/2016 | Sunaga et al. |
| 2016/0252808 | A1 | 9/2016 | Berneth et al. |
| 2016/0313696 | A1 | 10/2016 | Bang et al. |
| 2017/0160700 | A1 | 6/2017 | Wang et al. |
| 2017/0200463 | A1 | 7/2017 | Ishii et al. |
| 2018/0217311 | A1 | 8/2018 | Hiraoka et al. |
| 2019/0317450 | A1 | 10/2019 | Yaroshchuk et al. |
| 2019/0339646 | A1 | 11/2019 | Kim et al. |
| 2020/0103651 | A1 | 4/2020 | Ando et al. |
| 2020/0386927 | A1 | 12/2020 | Park et al. |
| 2021/0116862 | A1 | 4/2021 | Seo et al. |
| 2021/0239894 | A1 | 8/2021 | Jang et al. |

FOREIGN PATENT DOCUMENTS

| | | | |
|---|---|---|---|
| CN | 102483604 | A | 5/2012 |
| CN | 110389401 | A | 10/2019 |
| CN | 111213076 | A | 5/2020 |
| EP | 3327472 | A1 | 5/2018 |
| JP | H09185313 | A | 7/1997 |
| JP | 2001215334 | A | 8/2001 |
| JP | 2003202795 | A | 7/2003 |
| JP | 2005182976 | A | 7/2005 |
| JP | 3896140 | B2 | 3/2007 |
| JP | 2009294543 | A | 12/2009 |
| JP | 5278334 | B2 | 9/2013 |
| JP | 2016519327 | A | 6/2016 |
| JP | 2016537452 | A | 12/2016 |
| JP | 2017126390 | A | 7/2017 |
| JP | 2019537059 | A | 12/2019 |
| JP | 2020056881 | A | 4/2020 |
| KR | 20050091617 | A | 9/2005 |
| KR | 100619052 | B1 | 8/2006 |
| KR | 100657676 | B1 | 12/2006 |
| KR | 20090004696 | A | 1/2009 |
| KR | 100922430 | B1 | 10/2009 |
| KR | 20150105558 | A | 9/2015 |
| KR | 101675436 | B1 | 11/2016 |
| KR | 102048497 | B1 | 11/2019 |
| KR | 20200002192 | A | 1/2020 |
| KR | 20200030173 | A | 3/2020 |
| KR | 20200035780 | A | 4/2020 |
| TW | 201640235 | A | 11/2016 |
| TW | 201939154 | A | 10/2019 |
| WO | 2012042793 | A1 | 4/2012 |
| WO | 2014162928 | A1 | 10/2014 |

OTHER PUBLICATIONS

Extended European Search Report including Written Opinion for Application No. 21867180.8 dated Nov. 21, 2023, pp. 1-8.

* cited by examiner

[Fig. 1] (Prior Art)
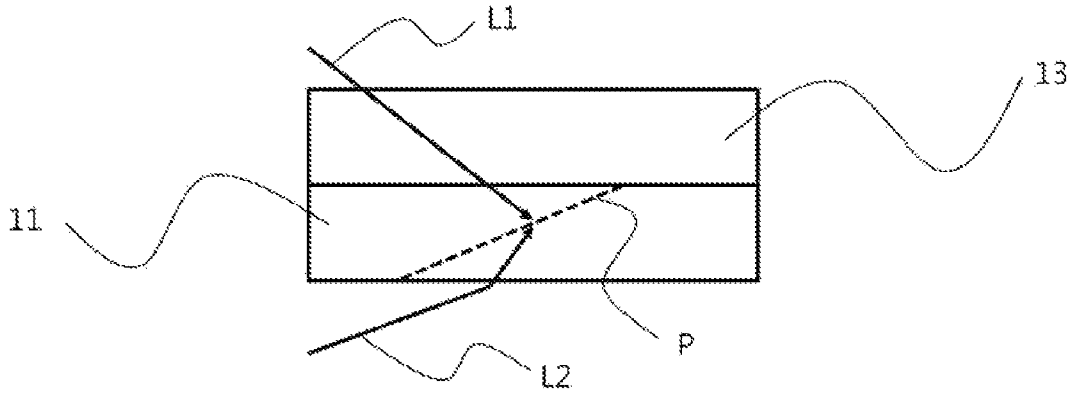
[Fig. 2](Prior Art)
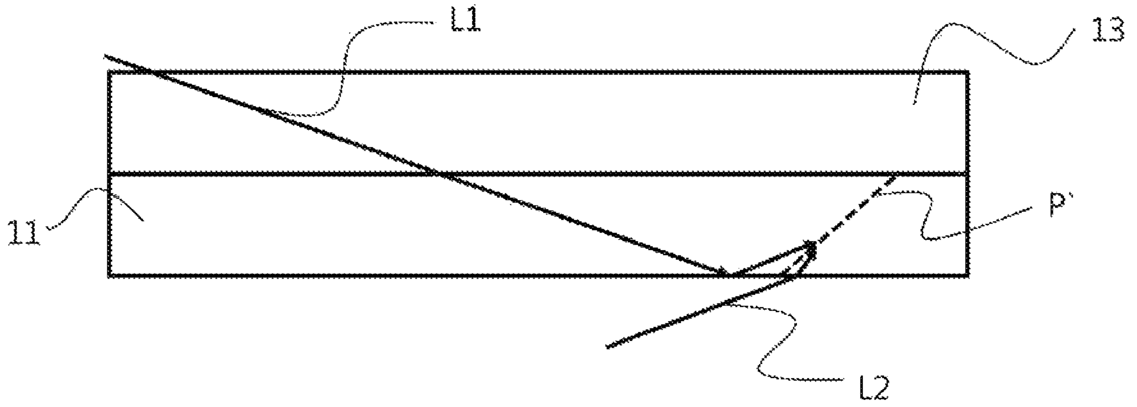

[Fig. 3]
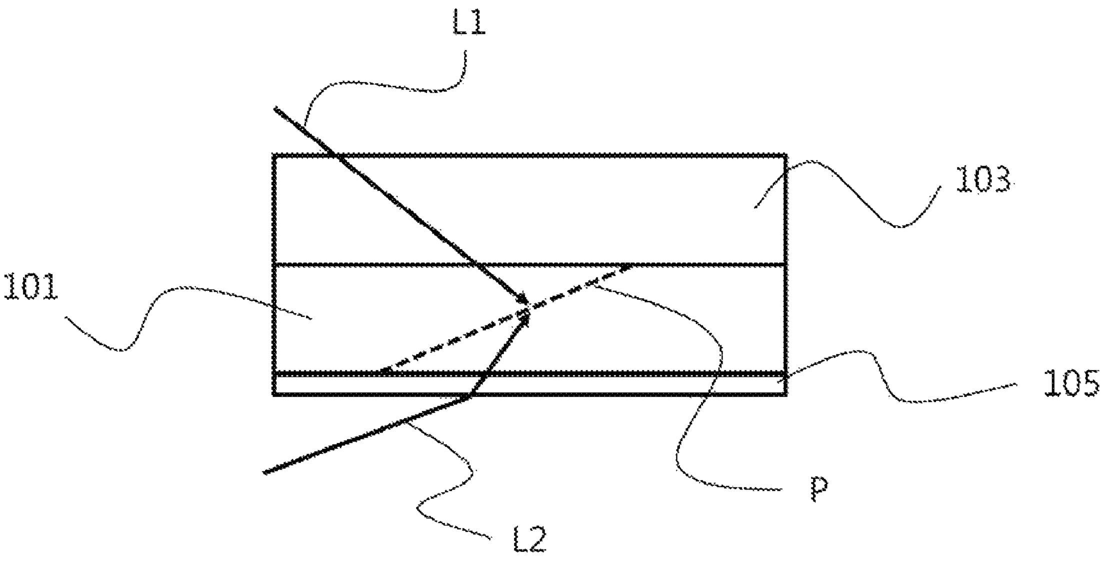
[Fig. 4]
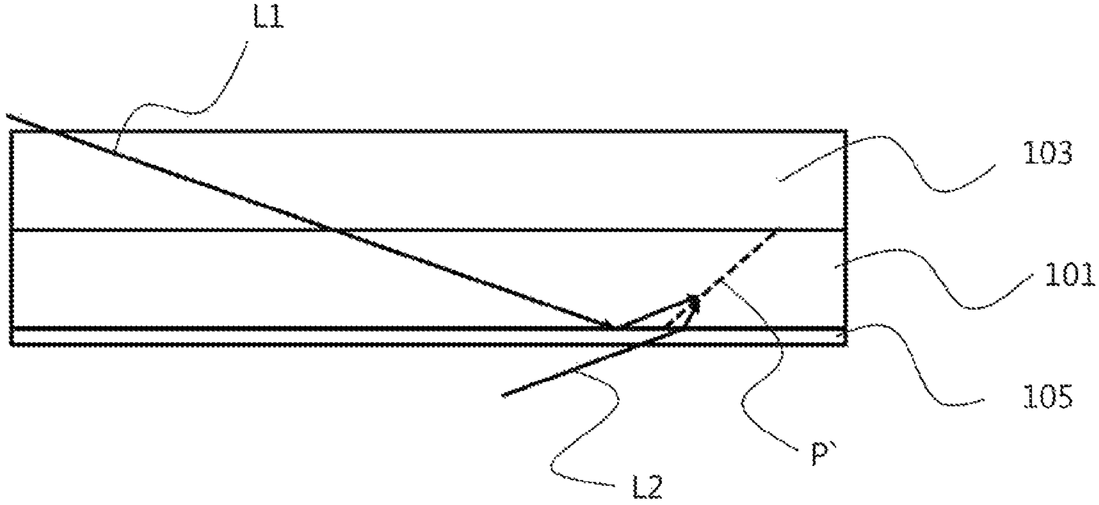

[Fig. 5]
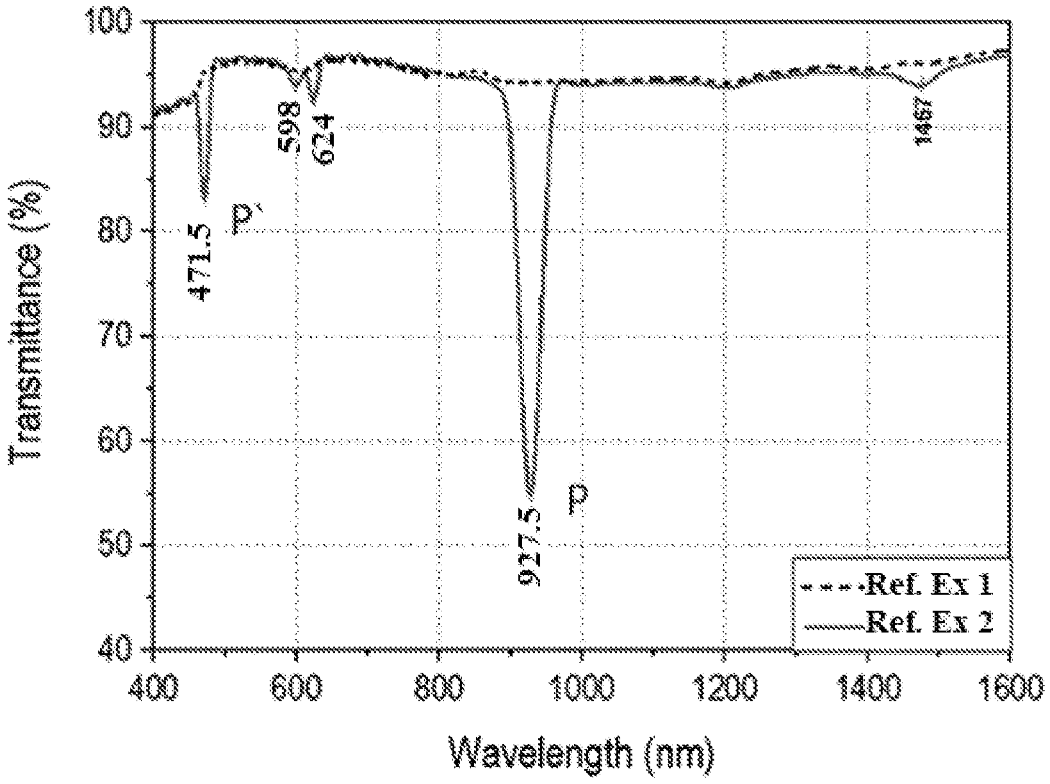

HOLOGRAPHIC OPTICAL ELEMENT AND METHOD FOR MANUFACTURING SAME

CROSS-REFERENCE TO RELATED APPLICATIONS

This application is a national phase entry under 35 U.S.C. § 371 of International Application No. PCT/KR2021/012390, filed on Sep. 13, 2021, which claims priority from Korean Patent Application No. 10-2020-0117902, filed on Sep. 14, 2020, the entire contents of which are incorporated by reference herein.

BACKGROUND

Technical Field

The present disclosure relates to a holographic optical element and a method for producing the same, and particularly, to a holographic optical element and a method for producing the same, in which the holographic optical element is produced using a retardation layer to prevent an unwanted interference pattern from being formed in the process of recording an interference pattern in a photopolymer resin layer.

Related Art

In general, holography refers to a technique of recording an interference pattern between an object wave and a reference wave, which includes image information, in a photosensitive material by the use of a coherent light source, and illuminating the photosensitive material having the interference pattern recorded therein with the same reference wave as used for recording, thereby reconstructing the image information recorded in the photosensitive material. Since the photosensitive material having the interference pattern recorded therein reconstructs image information by diffraction instead of reflection or refraction, this photosensitive material is also classified as a type of diffraction optical element (DOE).

FIG. 1 is a schematic view showing a process of recording an interference pattern to produce a holographic optical element according to a conventional art. As shown therein, a holographic optical element is generally produced by illuminating a photosensitive material with a reference beam that is a first parallel laser beam L1 and an object beam that is a second parallel laser beam L2, thereby recording an interference pattern P created by interference between the reference beam and the object beam. However, it is preferable to convert the beam to a linearly polarized beam to enhance interference between the reference beam and the object beam.

Specifically, when each of the reference beam and the object beam is converted to a P wave (horizontal linearly polarized beam) or when each of the reference beam and the object beam is converted to an S wave (vertical linearly polarized beam), the constructive interference between the two beams becomes stronger, and the destructive interference therebetween becomes weaker, so that a clear interference pattern is created.

However, when the reference beam or the object beam travels from a photopolymer resin layer having a high refractive index to an air layer having a low refractive index, a problem arises in that total reflection occurs and interference between the totally reflected beam and another beam occurs again, causing an unwanted interference pattern, which reduces the diffraction efficiency of the holographic optical element. In addition, there is a problem in that, when the unwanted interference pattern is illuminated with a reconstruction beam which is diffracted, it is reconstructed at an angle that has not been recorded.

FIG. 2 is a schematic view showing illustrating a process in which an unwanted interference pattern P' is recorded in a holographic optical element according to a conventional art. Referring to FIG. 2, a holographic optical element is illuminated with a reference beam, which is a first parallel laser beam L1 polarized as an S wave, through a prism 13 having a refractive index of 1.5, and the reference beam enters a photopolymer resin layer 11 having a refractive index of 1.5. At the same time, the holographic optical element is illuminated with an object beam, which is a second parallel laser beam L2 polarized as an S wave, thereby recording an interference pattern P between the reference beam and the object beam. However, when the reference beam, which is the first parallel laser beam L1 polarized as an S wave, travels from the photopolymer resin layer 11 having a refractive index of 1.5 to an air layer having a refractive index of 1, total reflection occurs at the interface between the photopolymer resin layer 11 and the air layer, and the totally reflected reference beam causes the interference with the object beam again, thereby forming the unwanted interference pattern P'.

As described above, the unwanted interference pattern P' has a problem in that it reduces the diffraction efficiency of the holographic optical element, and is also reconstructed at an angle that has not been recorded, when it is irradiated with a reconstruction beam. Therefore, there is an urgent need to develop technology to solve this problem.

SUMMARY

Technical Problem

An object of the present disclosure is to provide a holographic interference pattern and a method for producing the same, in which the holographic interference pattern is produced using a retardation layer to eliminate the occurrence of an unwanted interference pattern.

However, an object of the present disclosure is not limited to the above-mentioned object, and other objects not mentioned herein will be clearly understood by those skilled in the art from the following description.

Technical Solution

An embodiment of the present disclosure provides a method for producing a holographic optical element, the method including illuminating a first surface of a photopolymer resin layer with a first parallel laser beam, wherein the photopolymer resin layer includes a photopolymer resin, illuminating a second surface of the photopolymer resin layer through a retardation layer disposed on the second surface with a second parallel laser beam, wherein the second surface is opposite the first surface, and recording an interference pattern in the photopolymer resin layer, wherein the interference pattern is created by interference between the first parallel laser beam and the second parallel laser beam.

According to one embodiment of the present disclosure, an incident angle at which the first parallel laser beam is incident on the photopolymer resin layer may be greater than 42° and smaller than 90°.

According to one embodiment of the present disclosure, the first parallel laser beam may be a linearly polarized beam, and the second parallel laser beam may be a circularly polarized beam or an elliptically polarized beam.

According to one embodiment of the present disclosure, the retardation layer may have a λ/4 wavelength phase retardation characteristic.

According to one embodiment of the present disclosure, the method further comprises illuminating the first surface of the photopolymer resin layer through a prism disposed on the first surface of the photopolymer resin layer.

According to one embodiment of the present disclosure, the light transmittance of the retardation layer may be higher than 90% and lower than or equal to 100%, and the haze of the retardation layer may be higher than 0% and lower than 1%.

According to one embodiment of the present disclosure, the retardation layer may convert a circularly polarized beam or an elliptically polarized beam to a linearly polarized beam.

According to one embodiment of the present disclosure, the method may further include removing the retardation layer from the photopolymer resin layer having the interference pattern recorded therein.

According to one embodiment of the present disclosure, the method may further include bleaching the photopolymer resin layer, having the interference pattern recorded therein, by illumination with light having a wavelength in a UV-Vis wavelength region.

Another embodiment of the present disclosure provides a holographic optical element including a photopolymer resin layer comprising a first surface and a second surface opposite the first surface, wherein the photopolymer resin layer includes a photopolymer resin, and a retardation layer disposed on the second surface of the photopolymer resin layer, wherein the photopolymer resin layer has an interference pattern recorded therein, where the interference pattern was created by interference between laser beams, and wherein the photopolymer resin layer has a light transmittance higher than 0% or lower than or equal to 70%, or higher than 90% and lower than or equal to 100%, for light which has a wavelength of 400 nm to 1,600 nm and which illuminates the photopolymer resin layer in a direction perpendicular to the first surface of the photopolymer resin layer, which is a surface on which the retardation layer is not provided.

According to one embodiment of the present disclosure, the retardation layer may have a λ/4 wavelength phase retardation characteristic.

According to one embodiment of the present disclosure, the light transmittance of the retardation layer may be higher than 90% and lower than or equal to 100%, and the haze of the retardation layer may be higher than 0% and lower than 1%.

According to one embodiment of the present disclosure, the interference pattern may be created by interference between a first parallel laser beam and a second parallel laser beam, wherein the first surface of the photopolymer resin layer is illuminated by the first parallel laser beam, and wherein the second surface of the photopolymer resin layer is illuminating through the retardation layer by the second parallel laser beam.

Effect of the Invention

According to the method for producing a holographic optical element, which is one embodiment of the present disclosure, it is possible to eliminate the occurrence of an unwanted interference pattern by a simple method.

According to the holographic optical element which is another embodiment of the present disclosure, it is possible to minimize the occurrence of an unwanted interference pattern and enhance the diffraction efficiency of the holographic optical element while clarifying the recorded interference pattern.

Effects of the present disclosure are not limited to the above-described effects, and effects not mentioned herein will be clearly understood by those skilled in the art from the present specification and the accompanying drawings.

BRIEF DESCRIPTION OF THE DRAWINGS

FIG. 1 is a schematic view showing a process of recording an interference pattern to produce a holographic optical element according to a conventional art.

FIG. 2 is a schematic view showing a process in which an unwanted interference pattern is recorded in a holographic optical element according to a conventional art.

FIG. 3 is a schematic view showing a process of recording an interference pattern to produce a holographic optical element according to one embodiment of the present disclosure.

FIG. 4 is a schematic view showing a process of eliminating the occurrence of an unwanted interference pattern in a holographic optical element according to one embodiment of the present disclosure.

FIG. 5 is a graph showing the light transmittance of each of Reference Example 1 and Reference Example 2 for light having a wavelength of 400 nm to 1,600 nm.

DETAILED DESCRIPTION

Throughout the present specification, it is to be understood that when any part is referred to as “including” any component, it does not exclude other components, but may further include other components, unless otherwise specified.

Throughout the present specification, when any member is referred to as being “on” another member, it not only refers to a case where any member is in contact with another member, but also a case where a third member exists between the two members.

Throughout the present specification, the unit “parts by weight” may refer to the ratio of weight between components.

Throughout the present specification, the term “(meth) acrylate” is used to include both acrylate and methacrylate.

Throughout the present specification, “A and/or B” means “A and B” or “A or B”.

Throughout the present specification, the term “monomer unit” may refer to the form of a reacted monomer in a polymer thereof. Specifically, the term may refer to a form in which the monomer forms a backbone of the polymer, for example, a main chain or a side chain, through a polymerization reaction.

Throughout the present specification, the term “interference pattern” refers to a pattern formed by interference between two or more beams.

Throughout the present specification, the term “incident angle” refers to an angle formed between an imaginary vertical line of a plane on which light is incident and an imaginary straight line in a direction in which light travels at the moment the light is incident on the plane. Specifically, the term refers to an angle formed between the normal of the incident plane and an imaginary straight line in a direction in which light travels at the moment it is incident on the incident plane.

Throughout the present specification, the term "illumination angle" means an angle formed between an imaginary straight line in a direction in which light is illuminated and travels and an imaginary vertical line perpendicular to the illuminated plane.

Hereinafter, the present disclosure will be described in more detail.

An embodiment of the present disclosure provides a method for producing a holographic optical element, the method the method including illuminating a first surface of a photopolymer resin layer with a first parallel laser beam, wherein the photopolymer resin layer includes a photopolymer resin, illuminating a second surface of the photopolymer resin layer through a retardation layer disposed on the second surface with a second parallel laser beam, wherein the second surface is opposite the first surface, and recording an interference pattern in the photopolymer resin layer, wherein the interference pattern is created by interference between the first parallel laser beam and the second parallel laser beam.

According to the method for producing a holographic optical element, which is one embodiment of the present disclosure, it is possible to eliminate the occurrence of an unwanted interference pattern by a simple method.

According to one embodiment of the present disclosure, the method includes illuminating the second surface of the photopolymer resin layer through a retardation layer, where the photopolymer resin layer includes a photopolymer resin. As the retardation layer is provided on one surface of the photopolymer resin layer containing the photopolymer resin as described above, it is possible to minimize the occurrence of an unwanted interference pattern in the process of recording the interference pattern, and to enhance the diffraction efficiency of the holographic optical element.

According to one embodiment of the present disclosure, the photopolymer resin layer includes a photopolymer resin. As the photopolymer resin layer includes the photopolymer resin as described above, the interference pattern created by interference between the first parallel laser beam and the second parallel laser beam may be effectively recorded in the photopolymer resin layer.

According to one embodiment of the present disclosure, the photopolymer resin may include a polymer obtained from a photopolymer composition containing a photoreactive monomer and a photoinitiator. As the photopolymer composition containing the photoreactive monomer and the photoinitiator as described above is used, it is possible to form a pattern on the photopolymer resin layer by illuminating the photopolymer resin layer with beams while realizing fundamental physical properties of the photopolymer resin.

According to one embodiment of the present disclosure, the photoreactive monomer may include a polyfunctional (meth)acrylate monomer or a monofunctional (meth)acrylate monomer.

The monomer is polymerized during photopolymerization of the photopolymer composition as described above. As a result, the refractive index of the photopolymer resin layer increases in a portion where a relatively large amount of the polymer is present, and the refractive index relatively decreases in the other portions, resulting in refractive index modulation. A diffraction grating, that is, an interference pattern, may be created by this refractive index modulation.

According to one embodiment of the present disclosure, the photoreactive monomer may be a (meth)acrylate-based α,β-unsaturated carboxylic acid derivative. More specifically, the photoreactive monomer may be (meth)acrylate, (meth)acrylamide, (meth)acrylonitrile, (meth)acrylic acid, or a compound containing a vinyl group or a thiol group.

According to one embodiment of the present disclosure, examples of the photoreactive monomer include a polyfunctional (meth)acrylate monomer having a refractive index of 1.5 or higher. These polyfunctional (meth)acrylate monomers having a refractive index of 1.5 or higher may contain a halogen atom (bromine, iodine, etc.), sulfur (S), phosphorus (P), or an aromatic ring.

According to one embodiment of the present disclosure, examples of the polyfunctional (meth)acrylate monomer having a refractive index of 1.5 or higher include bisphenol A modified diacrylate series, fluorene acrylate series, bisphenol fluorene epoxy acrylate series (HR6100, HR6060, HR6042, etc., manufactured by Miwon Specialty Chemical Co., Ltd.), and halogenated epoxy acrylate series (HR1139, HR3362, etc., manufactured by Miwon Specialty Chemical Co., Ltd.).

According to one embodiment of the present disclosure, examples of the photoreactive monomer include a monofunctional (meth)acrylate monomer. The monofunctional (meth)acrylate monomer may contain an ether bond and a fluorene functional group in the molecule. Specific examples of this monofunctional (meth)acrylate monomer include phenoxybenzyl (meth)acrylate, o-phenylphenol ethylene oxide (meth)acrylate, benzyl (meth)acrylate, 2-(phenylthio)ethyl (meth)acrylate, (meth)acrylate.

According to one embodiment of the present disclosure, the photoreactive monomer may have a molecular weight of 50 g/mol to 1,000 g/mol, or 200 g/mol to 600 g/mol.

According to one embodiment of the present disclosure, the photopolymer composition contains a photoinitiator. As the photoinitiator, which is a compound activated by light or actinic radiation, is contained as described above, it initiates polymerization of a compound containing a photoreactive functional group, such as the photoreactive monomer.

According to one embodiment of the present disclosure, examples of the photoinitiator include a photoradical polymerization initiator and a photocationic polymerization initiator.

According to one embodiment of the present disclosure, examples of the photoradical polymerization initiator include imidazole derivatives, bisimidazole derivatives, N-aryl glycine derivatives, organic azide compounds, titanocene, aluminate complexes, organic peroxide, N-alkoxypyridinium salts, thioxanthone derivatives, and the like. Specifically, examples of the photoradical polymerization initiator include 1,3-di(t-butyldioxycarbonyl)benzophenone, 3,3',4,4'-tetrakis(t-butyldioxycarbonyl)benzophenone, 3-phenyl-5-isoxazolone, 2-mercaptobenzimidazole, bis(2,4,5-triphenyl)imidazole, 2,2-dimethoxy-1,2-diphenylethane-1-one (product name: Irgacure 651; manufacturer: BASF), 1-hydroxy-cyclohexyl-phenyl-ketone (product name: Irgacure 184; manufacturer: BASF), 2-benzyl-2-dimethylamino-1-(4-morpholinophenyl)-butanone-1 (product name: Irgacure 369/manufacturer: BASF), bis(η5-2,4-cyclopentadiene-1-yl)-bis(2,6-difluoro-3-(1H-pyrrole-1-yl)-phenyl)titanium (product name: Irgacure 784; manufacturer: BASF), and the like.

According to one embodiment of the present disclosure, examples of the photocationic polymerization initiator include a diazonium salt, a sulfonium salt, or an iodonium salt, and examples thereof include sulfonic acid esters, imidosulfonates, dialkyl-4-hydroxysulfonium salts, arylsulfonic acid-p-nitrobenzyl esters, silanol-aluminum complexes, (η6-benzene) (η5-cyclopentadienyl)iron (II), and the like. In addition, benzoin tosylate, 2,5-dinitrobenzyltosylate, N-tosylphthalic acid imide, and the like may also be mentioned. More specific examples of the photocationic polymerization initiator include commercially available products such as Cyracure UVI-6970, Cyracure UVI-6974 and Cyracure UVI-6990 (manufacturer: Dow Chemical Co. in USA), Irgacure 264 and Irgacure 250 (manufacturer: BASF), or CIT-1682 (manufacturer: Nippon Soda).

According to one embodiment of the present disclosure, the photopolymer composition may contain a monomolecular (type I) initiator or a bimolecular (type II) initiator. Examples of the monomolecular (type I) initiator for free radical photopolymerization include aromatic ketone compounds combined with a tertiary amine, such as benzophenone, alkylbenzophenone, 4,4'-bis(dimethylamino)benzophenone (Michler's ketone), anthrone and halogenated benzophenone, or mixtures thereof. Examples of the bimolecular (type II) initiator include benzoin and derivatives thereof, benzyl ketal, acylphosphine oxide, for example, 2,4,6-trimethylbenzoyldiphenylphosphine oxide, bisacylophosphine oxide, phenylglyoxyl ester, camphorquinone, alpha-aminoalkylphenone, alpha-dialkoxyacetophenone, 1-[4-(phenylthio)phenyl]octane-1,2-dione 2-(O-benzoyloxime), alpha-hydroxyalkylphenone, and the like.

According to one embodiment of the present disclosure, the photopolymer composition may contain 10 wt % to 70 wt % of the photoreactive monomer, and 0.1 wt % to 15 wt % of the photoinitiator, or contain 20 wt % to 60 wt % of the photoreactive monomer, and 0.1 wt % to 10 wt % of the photoinitiator. When the photopolymer composition further contains an organic solvent as described below, the contents of the above-described components are based on the total weight of the above-described components (the total weight of the components excluding the organic solvent).

According to one embodiment of the present disclosure, the photopolymer composition may further contain a photosensitizing dye. The photosensitizing dye serves as a photosensitizing pigment to sensitize the photoinitiator. Specifically, the photosensitizing dye may be stimulated by the light with which the photopolymer composition is illuminated, and may also serve as an initiator to initiate polymerization of the monomer and the cross-linking monomer. The photopolymer composition may contain 0.01 wt % to 30 wt %, or 0.05 wt % to 20 wt % of the photosensitizing dye.

According to one embodiment of the present disclosure, examples of the photosensitizing dye include sulfonium derivatives of ceramidonine, new methylene blue, thioerythrosine triethylammonium, 6-acetylamino-2-methylceramidonin, eosin, erythrosine, rose bengal, thionine, basic yellow, pinacyanol chloride, rhodamine 6G, gallocyanine, ethyl violet, Victoria blue R, Celestine blue, Quinaldine red, crystal violet, brilliant green, Astrazon orange G, Darrow red, Pyronin Y, basic red 29, pyrylium iodide, safranin O, cyanine, methylene blue, azure A, and combinations of two or more thereof.

According to one embodiment of the present disclosure, the photopolymer composition may further contain an organic solvent. Non-limiting examples of the organic solvent include ketones, alcohols, acetates, ethers, and mixtures of two or more thereof.

According to one embodiment of the present disclosure, examples of the organic solvent include: ketones such as methyl ethyl ketone, methyl isobutyl ketone, acetylacetone or isobutyl ketone; alcohols such as methanol, ethanol, n-propanol, i-propanol, n-butanol, i-butanol or t-butanol; acetates such as ethyl acetate, i-propyl acetate, or polyethylene glycol monomethyl ether acetate; ethers such as tetrahydrofuran or propylene glycol monomethyl ether; or mixtures of two or more thereof.

According to one embodiment of the present disclosure, the organic solvent may be added at the time of mixing the respective components contained in the photopolymer composition, or may be contained in the photopolymer composition by adding the respective components dispersed or mixed in the organic solvent. When the content of the organic solvent in the photopolymer composition is excessively low, flowability of the photopolymer composition may be lowered, resulting in the occurrence of defects such as striped patterns on the finally produced film. In addition, if an excessively large amount of the organic solvent is added, the solid content is lowered, and coating and film formation are not sufficient, so that physical properties and surface characteristics of the film may be degraded and defects may occur during the drying and curing processes. Thus, the photopolymer composition may contain the organic solvent such that the total solid content of the components contained therein is 1 wt % to 70 wt %, or 2 wt % to 50 wt %.

According to one embodiment of the present disclosure, the photopolymer composition may further contain other additives, a catalyst, and the like. The photopolymer composition may contain a commonly known catalyst to promote polymerization of the photoreactive monomer. Examples of the catalyst include tin octanoate, zinc octanoate, dibutyltin dilaurate, dimethylbis[(1-oxoneodecyl)oxy] stannane, dimethyltin dicarboxylate, zirconium bis(ethylhexanoate), zirconium acetylacetonate or tertiary amines, for example, 1,4-diazabicyclo[2.2.2]octane, diazabicyclononane, diazabicycloundecane, 1,1,3,3-tetramethylguanidine, 1,3,4,6,7,8-hexahydro-1-methyl-2H-pyrimido(1,2-a) pyrimidine, and the like.

According to one embodiment of the present disclosure, the method for producing a holographic optical element is performed using a retardation layer. By using the retardation layer as described above, it is possible to change the phase of the first parallel laser beam and/or the second parallel laser beam.

According to one embodiment of the present disclosure, the retardation layer may have a single-layer structure or a multi-layer structure in which two or more layers are laminated. When the retardation layer has a multi-layer structure, the layers of the multi-layer structure may be attached together by a sticking agent or an adhesive, or may be laminated together by direct coating. As the retardation layer may have a single-layer structure or a multi-layer structure in which two or more layers are laminated, as described above, it may effectively change the phase of the first parallel laser beam and/or the second parallel laser beam.

According to one embodiment of the present disclosure, the retardation layer may be a liquid crystal film or a polymer film. Specifically, it is possible to use a film obtained by stretching a light-transmitting polymer film, which may be given optical anisotropy by stretching, in an appropriate manner, or to use a liquid crystal film formed by aligning a liquid crystal compound. In addition, a non-stretched polymer film may also be used as long as it has optical anisotropy. As the liquid crystal film and/or the polymer film is used as the retardation layer as described above, the retardation layer may effectively change the phase of the first parallel laser beam and/or the second parallel laser beam.

According to one embodiment of the present disclosure, the method includes a step of recording an interference pattern, created by interference between a first parallel laser beam and a second parallel laser beam, in the photopolymer resin layer by illuminating the other surface of the photopolymer resin layer, which is a surface on which the retardation layer is not provided, with the first parallel laser beam, and illuminating the one surface of the photopolymer resin layer with the second parallel laser beam. As the interference pattern created by interference between the first parallel laser beam and the second parallel laser beam is recorded in the photopolymer resin layer by illuminating the other surface of the photopolymer resin layer, which is a surface on which the retardation layer is not provided, with the first parallel laser beam, and illuminating the one surface of the photopolymer resin layer with the second parallel laser beam, as described above, it is possible to eliminate the occurrence of an unwanted interference pattern on the photopolymer resin layer.

According to one embodiment of the present disclosure, the interference pattern may be recorded in the photopolymer resin layer by allowing the first parallel laser beam to be incident on one side of the photopolymer resin layer at a predetermined incident angle, and allowing the second parallel laser beam to be incident on the other side of the photopolymer resin layer. As the first parallel laser beam and the second parallel laser beam are allowed to be incident on the photopolymer resin layer, it is possible to effectively enhance the interference pattern in the photopolymer resin layer.

According to one embodiment of the present disclosure, the holographic optical element includes an interference pattern recorded in the photopolymer resin layer by interference between the first parallel laser beam, which has been incident on one side of the photopolymer resin layer at a predetermined incident angle, and the second parallel laser beam which has been incident on the other side of the photopolymer resin layer. In the present disclosure, a pattern formed by interference between the first parallel laser beam and the second parallel laser beam is defined as an interference pattern. Specifically, when the first parallel laser beam is allowed to be incident on one side of the photopolymer resin layer and then the second parallel laser beam is allowed to be incident on the other side forming an angle with the one side, interference occurs between the parallel laser beams in the photopolymer resin layer. Thereafter, in an overlapping portion in the interference pattern formed in the photopolymer resin layer, that is, in a portion where constructive interference occurs, the components in the photopolymer resin layer undergo an additional polymerization reaction, and thus the refractive index of the portion changes. In addition, in a non-overlapping portion (a portion where destructive interference occurs) in the interference pattern, a weak additional polymerization reaction occurs, and thus the refractive index of the portion becomes weak. As a result, an interference pattern in which the constructive interference portion and the destructive interference portion are repeated is recorded by the interference between the two beams. Accordingly, when light is allowed to be incident on the photopolymer resin layer, the light is uniformly refracted by the pattern portions having different refractive indices, recorded in the photopolymer resin layer.

According to one embodiment of the present disclosure, the wavelengths of the first parallel laser beam and the second parallel laser beam are not particularly limited, and may be appropriately selected in consideration of the intended use of the produced holographic optical element. Specifically, as the parallel laser beam, a single laser having any one wavelength or two or more lasers having different wavelengths may be used. More specifically, to create a full color hologram, lasers having three wavelengths corresponding to the red (R), green (G), and blue (B) regions may be used in combination.

According to one embodiment of the present disclosure, the first and/or second parallel laser beam may both be a continuous wave (CW) laser. Since the continuous wave laser has a stable output compared to a pulse laser, an interference pattern having uniform optical properties may be recorded in the light exposed area of the photosensitive material.

According to one embodiment of the present disclosure, the first and/or second parallel laser beam may both be a single longitudinal mode laser. This is because, when a multi-mode laser is used, coherency between the light passing through the retardation layer and the diffracted light may decrease.

According to one embodiment of the present disclosure, the parallel laser beam may be controlled to have the same intensity throughout the entire region of the photopolymer resin layer which is illuminated with the parallel laser beam. As described above, the optical properties created in the photopolymer resin layer may be controlled.

According to one embodiment of the present disclosure, the photopolymer resin layer is illuminated with the first parallel laser beam and the second parallel laser beam at a predetermined illumination angle. Specifically, the photopolymer resin layer is illuminated with the first parallel laser beam and the second parallel laser beam at a predetermined illumination angle, and the first parallel laser beam and the second parallel laser beam are then incident on the photopolymer resin layer at a predetermined incident angle. The illumination angles of the first parallel laser beam and the second parallel laser beam are not particularly limited, and may be determined in consideration of the properties of a hologram to be recorded in the photopolymer resin layer and a holographic optical element to be produced.

According to one embodiment of the present disclosure, an incident angle at which the first parallel laser beam with which the photopolymer resin layer has been illuminated is incident on the photopolymer resin layer may be greater than 42° and smaller than 90°. Specifically, the illumination angle of the first parallel laser beam may be 43° to smaller than 90°, 44° to smaller than 90°, smaller than 45°, smaller than 90°, 46° to smaller than 90°, 47° to smaller than 90°, 48° to smaller than 90°, 49° to smaller than 90°, 50° to smaller than 90°, 55° to smaller than 90°, 60° to smaller than 90°, 65° to smaller than 90°, 70° to smaller than 90°, 75° to smaller than 90°, or 80° to smaller than 90°. More specifically, the incident angle of the first parallel laser beam may be an incident angle at which total reflection occurs at the interface between the photopolymer layer and an air layer. As the incident angle of the first parallel laser beam is controlled within the above-described range, an unwanted interference pattern caused by total reflection at the interface between the photopolymer layer and the air layer is converted into light, which causes destructive interference, by the retardation layer, and thus it is possible to prevent the occurrence of the unwanted interference pattern.

According to one embodiment of the present disclosure, the photopolymer resin layer is illuminated with the first parallel laser beam and the second parallel laser beam so that interference occurs within the photopolymer resin layer. In the field of producing a holographic optical element, in order to record a hologram in a photosensitive material, coherent object and reference beams should be used, and the photopolymer resin should be illuminated with the object beam and the reference beam so that an interference beam is recorded in the photopolymer resin by interference between the object beam and the reference beam inside the photopolymer resin.

According to one embodiment of the present disclosure, the polymer resin layer may be illuminated with the two parallel laser beams so that the linear regions of the photopolymer resin layer, which are illuminated with the two beams, respectively, are consistent with each other on the same surface or opposite surfaces.

According to one embodiment of the present disclosure, when any one surface of the photopolymer resin layer is illuminated with the first parallel laser beam and a surface opposite to the one surface is illuminated with the second parallel laser beam, a region illuminated with the first parallel laser beam and a region illuminated with the second parallel laser beam are at positions corresponding to each other on the respective surfaces which are opposite to each other. Accordingly, the optical paths in which the first parallel laser beam and the second parallel laser beam travel inside the photopolymer resin included in the photopolymer resin layer may overlap each other, and interference between the beams may occur.

According to one embodiment of the present disclosure, when the same one surface of the photopolymer resin layer is illuminated with the first parallel laser beam and the second parallel laser beam, the same region on the same one surface of the photopolymer resin layer is illuminated with the first parallel laser beam and the second parallel laser beam. Accordingly, the optical paths in which the first parallel laser beam and the second parallel laser beam travel inside the photopolymer resin included in the photopolymer resin layer may overlap each other, and interference between the beams may occur.

According to one embodiment of the present disclosure, the first parallel laser beam may be a linearly polarized beam. Specifically, the first parallel laser beam may be an S wave or a P wave. As the S wave or the P wave is selected as the first parallel laser beam, a clear interference pattern may be created.

According to one embodiment of the present disclosure, the second parallel laser beam may be a circularly polarized beam or an elliptically polarized beam. Specifically, where the first parallel laser beam is an S wave, the second parallel laser beam preferably changes to an S wave when the second parallel laser beam passes through the retardation layer. In addition, where the first parallel laser beam is a P wave, the second parallel laser beam preferably changes to a P wave when the second parallel laser beam passes through the retardation layer. As the second parallel laser beam is a circularly polarized or elliptically polarized beam and is controlled to change when passing through the retardation layer as described above, the occurrence of an unwanted interference pattern in the photopolymer resin layer may be eliminated.

According to one embodiment of the present disclosure, the retardation layer may have a $\lambda/4$ wavelength phase retardation characteristic. As used herein, the term "$\lambda/n$ wavelength phase retardation characteristic" refers to a characteristic capable of retarding an incident beam by n times the wavelength of the incident beam within at least a portion of the wavelength range. The $\lambda/n$ wavelength phase retardation characteristic may be a characteristic of converting an incident linearly polarized beam to an elliptically polarized beam or circularly polarized beam, or a characteristic of converting an incident elliptically polarized beam or circularly polarized beam to a linearly polarized beam. As the retardation layer is controlled to have the $\lambda/4$ wavelength phase retardation characteristic as described above, the occurrence of an unwanted interference pattern in the photopolymer resin layer may be eliminated.

According to one embodiment of the present disclosure, a prism may be further provided on the other surface of the photopolymer resin layer. Specifically, as the prism is further provided on the other surface of the photopolymer resin layer, the photopolymer resin layer may be illuminated with the first parallel laser beam through the prism, thereby preventing total reflection from not occurring. As a result, as the prism is further provided on the other surface of the photopolymer resin layer, it is possible to produce a holographic optical element in which a laser with which the photopolymer resin layer is illuminated at a specific wavelength may operate at a predetermined angle or a predetermined wavelength.

According to one embodiment of the present disclosure, the light transmittance of the retardation layer may be higher than 90% and lower than or equal to 100%. Specifically, the light transmittance of the retardation layer may be 91% to 99%, 92% to 98%, 93% to 97%, or 94% to 96%. As the light transmittance of the retardation layer is controlled within the above-described range, it is possible to enhance the optical efficiency of the parallel laser beam.

According to one embodiment of the present disclosure, the haze of the retardation layer may be higher than 0% and lower than 1%. As the haze of the retardation layer is controlled within the above range, it is possible to prevent the scattering of the parallel laser beam passing through the retardation layer.

According to one embodiment of the present disclosure, the retardation layer may convert a circularly polarized beam or an elliptically polarized beam to a linearly polarized beam. As one that converts a circularly polarized beam or an elliptically polarized light to a linearly polarized beam is selected as the retardation layer as described above, the occurrence of an unwanted interference pattern in the photopolymer resin layer may be eliminated.

According to one embodiment of the present disclosure, the method may further include removing the retardation layer from the photopolymer resin layer having the interference pattern recorded therein. As the method further includes the step of removing the retardation layer as described above, the holographic optical element may be miniaturized.

According to one embodiment of the present disclosure, the method may further include bleaching the photopolymer resin layer, having the interference pattern recorded therein, by illumination with light having a wavelength in a UV-Vis wavelength region. As the method further include the step of bleaching the photopolymer resin layer having the interference pattern recorded therein as described above, the reaction of the unreacted photoreactive monomer in the photopolymer resin included in the photopolymer resin layer may be completed.

According to one embodiment of the present disclosure, the wavelength of the light that is used in the bleaching step may be in the visible wavelength region or the ultraviolet wavelength region. As the wavelength of the light that is used in the bleaching step is controlled as described above, the reaction of the unreacted photoreactive monomer in the photopolymer resin may be effectively completed.

According to one embodiment of the present disclosure, the method may include additionally curing the photopolymer resin layer, after the bleaching step. The curing may be thermal curing or photocuring. As the photopolymer resin is additionally cured as described above, it is possible to further set the interference pattern recorded in the photopolymer resin layer, thereby enhancing the high-temperature durability thereof.

Another embodiment of the present disclosure provides a holographic optical element including a photopolymer resin layer comprising a first surface and a second surface opposite the first surface, where the photopolymer resin layer includes a photopolymer resin, and a retardation layer disposed on the second surface of the photopolymer resin layer, wherein the photopolymer resin layer has an interference pattern recorded therein, where the interference pattern was created by interference between laser beams, and the photopolymer resin layer has a light transmittance higher than 0% or lower than or equal to 70%, or higher than 90% and lower than or equal to 100%, for light which has a wavelength of 400 nm to 1,600 nm and which illuminates the photopolymer resin layer in a direction perpendicular to the first surface of the photopolymer resin layer, which is a surface on which the retardation layer is not provided.

According to the holographic optical element which is another embodiment of the present disclosure, it is possible to minimize the occurrence of an unwanted interference pattern and enhance the diffraction efficiency of the holographic optical element while clarifying the recorded interference pattern.

Throughout the present disclosure, the contents overlapping with the method for producing a holographic optical element are omitted.

According to one embodiment of the present disclosure, the holographic optical element has a light transmittance higher than 0% or lower than or equal to 70%, or higher than 90% and lower than or equal to 100%, for light which has a wavelength of 400 nm to 1,600 nm and with which the photopolymer resin layer is illuminated in direction perpendicular to the other surface of the photopolymer resin layer, which is a surface on which the retardation layer is not provided. Throughout the present specification, the term "light transmittance" may refer to the ratio of the amount of light transmitted through a specific object to the amount of light with which the specific object is illuminated. Specifically, the holographic optical element may have a light transmittance which does not belong to a range from higher than 70% to lower than or equal to 90% for light which has a wavelength of 400 nm to 1,600 nm and with which the photopolymer resin layer is illuminated in a direction perpendicular to the other surface of the photopolymer resin layer, which is a surface on which the retardation layer is not provided. More specifically, the holographic optical element may include a portion having a light transmittance higher than 90% to lower than or equal to 100% for light which has a wavelength of 400 nm to 1,600 nm and with which the photopolymer resin layer is illuminated in a direction perpendicular to the other surface of the photopolymer resin layer, which is a surface on which the retardation layer is not provided, and the remaining portion having a light transmittance higher than 0% and lower than or equal to 70%. As checking is made as to whether the holographic optical element has a light transmittance within the above-described range for light having a specific wavelength, it is possible to confirm the presence or absence of an unwanted interference pattern, and it is possible to enhance the diffraction efficiency of the holographic optical element.

According to one embodiment of the present disclosure, the wavelength of the light, with which the holographic optical element is illuminated in order to check the light transmittance, may be 400 nm to 1,600 nm. Specifically, the wavelength of the light with which the holographic optical element is illuminated in order to check the light transmittance, may be 450 nm to 1,550 nm, 500 nm to 1,500 nm, 550 nm to 1,450 nm, 600 nm to 1,400 nm, 650 nm to 1,350 nm, 700 nm to 1,300 nm, 750 nm to 1,250 nm, 800 nm to 1,200 nm, 850 nm to 1,150 nm, 900 nm to 1,100 nm, or 950 nm to 1,050 nm. As the wavelength of the light, with which the holographic optical element is illuminated in order to check the light transmittance, is controlled within the above-described range, it is possible to improve the accuracy of confirming the presence or absence of the unwanted interference pattern.

According to one embodiment of the present disclosure, the retardation layer may have a λ/4 wavelength phase retardation characteristic. As the retardation layer is controlled to have a λ/4 wavelength phase retardation characteristic as described above, it is possible to eliminate the occurrence of an unwanted interference pattern in the photopolymer resin layer.

According to one embodiment of the present disclosure, the light transmittance of the retardation layer may be higher than 90% and lower than or equal to 100%. Specifically, the light transmittance of the retardation layer may be 91% to 99%, 92% to 98%, 93% to 97%, or 94% to 96%. As the light transmittance of the retardation layer is controlled within the above-described range, it is possible to enhance the optical efficiency of the parallel laser beam.

According to one embodiment of the present disclosure, the haze of the retardation layer may be higher than 0% and lower than 1%. As the haze of the retardation layer is controlled within the above range, it is possible to prevent the scattering of the parallel laser beam passing through the retardation layer.

According to one embodiment of the present disclosure, the interference pattern may be created by interference between a first parallel laser beam and a second parallel laser beam, where the first surface of the photopolymer resin layer is illuminated by the first parallel laser beam, and where the second surface of the photopolymer resin layer is illuminated through the retardation layer with the second parallel laser beam. As the interference pattern is formed as described above, it is possible to form an interference pattern to be created.

Mode of the Invention

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

FIG. 3 is a schematic view showing a process of recording an interference pattern P to produce a holographic optical element according to one embodiment of the present disclosure. A holographic optical element is generally produced by illuminating a photosensitive material 101 with a first parallel laser beam L1 and a second parallel laser beam L2, thereby recording an interference pattern P created by interference between the first parallel laser beam L1 and the second parallel laser beam L2.

Specifically, it is preferable to convert the beam to a linearly polarized beam in order to enhance interference between the first parallel laser beam L1 and the second parallel laser beam L2. More specifically, when the first parallel laser beam L1 is converted to an S wave (vertical linearly polarized beam) and the second parallel laser beam L2, which is a circularly polarized beam or an elliptically polarized beam, is converted to an S wave (vertical linearly polarized beam) by passing through a retardation layer, the constructive interference between the two beams becomes stronger, and the destructive interference therebetween becomes weaker, so that a clear interference pattern is created.

On the other hand, when the first parallel laser beam L1 is converted to a P wave (horizontal linearly polarized beam) and the second parallel laser beam L2, which is a circularly polarized beam or an elliptically polarized beam, is converted to a P wave (horizontal linearly polarized beam) by passing through a retardation layer 105, the constructive interference between the two beams becomes stronger, and the destructive interference therebetween becomes weaker, so that a clear interference pattern is created.

FIG. 4 is a schematic view showing a process of eliminating the occurrence of an unwanted interference pattern in a holographic optical element according to one embodiment of the present disclosure. Specifically, FIG. 4 is a schematic diagram illustrating a process of minimizing the occurrence of an unwanted interference pattern in a holographic optical element according to one embodiment of the present disclosure. Referring to FIG. 4, when the first parallel laser beam L1 is changed to an S wave (vertical linearly polarized beam) as described above, total reflection occurs at the interface between the retardation layer and the air layer, and thus the first parallel laser beam L1 changes from the S wave to the P wave. At the same time, the P wave, which is the first parallel laser beam L1, does not form an interference pattern by causing destructive interference with the S wave, which is the second parallel laser beam L2 that changed by passing through the retardation layer, which makes it possible to form no unwanted interference pattern.

Likewise, when the first parallel laser beam L1 is changed to a P wave (horizontal linearly polarized beam) as described above, total reflection occurs at the interface between the retardation layer and the air layer, and thus the first parallel laser beam L1 changes from the P wave to the S wave. At the same time, the S wave, which is the first parallel laser beam L1, does not form an interference pattern by causing destructive interference with the P wave, which is the second parallel laser beam L2 that changed by passing through the retardation layer, which makes it possible to form no unwanted interference pattern.

Reference Example 1

One surface of a holographic optical element including only a photopolymer resin layer was illuminated vertically with light having a wavelength of 400 nm to 1,600 nm, and the light transmittance of the holographic optical element was measured. The results of the measurement are shown in FIG. 5.

Reference Example 2

A retardation layer was not provided on one surface of a holographic optical element including only a photopolymer resin layer, and an interference pattern created by interference between a first parallel laser beam and a second parallel laser beam was recorded in the photopolymer resin layer by illuminating one surface of the photopolymer resin layer with the second parallel laser beam and illuminating the other surface of the photopolymer resin layer with the first parallel laser beam. Thereafter, one surface of the holographic optical element was illuminated vertically with light having a wavelength of 400 nm to 1,600 nm, and the light transmittance of the holographic optical element was measured. The results of the measurement are shown in FIG. 5.

FIG. 5 is a graph showing the light transmittance of each of Reference Example 1 and Reference Example 2 for light having a wavelength of 400 nm to 1,600 nm. Referring to FIG. 5, it was confirmed that, in Reference Example 1, there was no interference pattern, and thus a peak corresponding to a light transmittance higher than 90% appeared in the entire wavelength region (400 nm to 1,600 nm). On the other hand, it was confirmed that, in Reference Example 2, an interference pattern was recorded in a state in which the retardation layer was not provided, so that an unwanted interference pattern was recorded, and thus a peak appeared at a light transmittance higher than 0% and lower than or equal to 70%, or higher than 90% and lower than or equal to 100%. Specifically, it was confirmed that, in Reference Example 2, a peak appeared in the region corresponding to a light transmittance higher than 70% and lower than or equal to 90%, indicating that an unwanted interference pattern was recorded.

Therefore, according to the present disclosure, it is possible to eliminate the occurrence of an unwanted interference pattern and enhance the diffraction efficiency of the holographic optical element, by using the retardation layer in the process of recording the interference pattern.

Although the present disclosure has been described with reference to limited embodiments, the present disclosure is not limited to these embodiments, and those skilled in the art will appreciate that various modifications and variations are possible without departing from the technical spirit of the present disclosure and equivalents to the appended claims.

DESCRIPTION OF REFERENCE NUMERAL

11, 101: Photopolymer Resin Layer
13, 103: Prism
105: Retardation Layer
L1: First Parallel Laser Beam
L2: Second Parallel Laser Beam
P: interference pattern
P': unwanted interference pattern

What is claimed is:

1. A method for producing a holographic optical element, the method comprising:

illuminating a first surface of a photopolymer resin layer with a first parallel laser beam, where the photopolymer resin layer comprises a photopolymer resin;

illuminating a second surface of the photopolymer resin layer through a retardation layer disposed on the second surface with a second parallel laser beam, wherein the second surface is opposite the first surface; and recording an interference pattern in the photopolymer resin layer, wherein the interference pattern is created by interference between the first parallel laser beam and the second parallel laser beam, wherein the photopolymer resin layer has a light transmittance higher than 0% and lower than or equal to 70%, or higher than 90% and lower than or equal to 100%, for light which has a wavelength of 400 nm to 1,600 nm and with which the photopolymer resin layer is illuminated in a direction perpendicular to the other surface of the photopolymer resin layer, which is a surface on which the retardation layer is not provided, wherein the first parallel laser beam is a linearly polarized beam, and the second parallel laser beam is a circularly polarized beam or an elliptically polarized beam, wherein the retardation layer is disposed on the second surface of the photopolymer resin layer such that the second parallel laser beam passes through the retardation layer before entering the photopolymer resin layer, wherein the retardation layer converts the second parallel laser beam into a linearly polarized beam corresponding to a polarization direction of the first parallel laser beam, and wherein an unwanted interference pattern caused by total reflection at an interface with an air layer is prevented.

2. The method of claim 1, wherein an incident angle at which the first parallel laser beam is incident on the photopolymer resin layer is greater than 42° and smaller than 90°.

3. The method of claim 1, wherein the retardation layer has a N/4 wavelength phase retardation characteristic.

4. The method of claim 1, wherein illuminating the first surface further comprises:

illuminating the first surface of the photopolymer resin layer through a prism disposed on the first surface of the photopolymer resin layer.

5. The method of claim 1, wherein the retardation layer has a light transmittance higher than 90% and lower than or equal to 100%, and the retardation layer has a haze higher than 0% and lower than 1%.

6. The method of claim 1, further comprising:

removing the retardation layer from the photopolymer resin layer having the interference pattern recorded therein.

7. The method of claim 1, further comprising:

bleaching the photopolymer resin layer, having the interference pattern recorded therein, by illumination with light having a wavelength in a UV-Vis wavelength region.

8. A holographic optical element comprising:

a photopolymer resin layer comprising a first surface and a second surface opposite the first surface, wherein the photopolymer resin layer comprising a photopolymer resin; and a retardation layer disposed on the second surface of the photopolymer resin layer;

wherein the photopolymer resin layer has an interference pattern recorded therein, where the interference pattern was created by interference between a first parallel laser beam and a second parallel laser beam, wherein the photopolymer resin layer has a light transmittance higher than 0% or lower than or equal to 70%, or higher than 90% and lower than or equal to 100%, for light which has a wavelength of 400 nm to 1,600 nm and which illuminates the photopolymer resin layer in a direction perpendicular to the first surface of the photopolymer resin layer, wherein the first parallel laser beam is a linearly polarized beam, and the second parallel laser beam is a circularly polarized beam or an elliptically polarized beam, wherein the first surface of the photopolymer resin layer is illuminated by the first parallel laser beam, wherein the retardation layer is disposed on the second surface of the photopolymer resin layer such that the second parallel laser beam passes through the retardation layer before entering the photopolymer resin layer, wherein the retardation layer converts the second parallel laser beam into a linearly polarized beam corresponding to a polarization direction of the first parallel laser beam, and wherein the photopolymer resin layer has the interference pattern recorded under a condition in which recording of an unwanted interference pattern caused by total reflection at an interface with an air layer is prevented.

9. The holographic optical element of claim 8, wherein the retardation layer has a 24 wavelength phase retardation characteristic.

10. The holographic optical element of claim 8, wherein the retardation layer has a light transmittance higher than 90% and lower than or equal to 100%, and the retardation layer has a haze higher than 0% and lower than 1%.

11. The holographic optical element of claim 8, wherein the interference pattern is created by interference between a first parallel laser beam and a second parallel laser beam, wherein the first surface of the photopolymer resin layer is illuminated by the first parallel laser beam, and wherein the second surface of the photopolymer resin layer is illuminated through the retardation layer by the second parallel laser beam.

* * * * *